United States Patent
Park

(10) Patent No.: US 7,342,940 B2
(45) Date of Patent: Mar. 11, 2008

(54) MEDIA ACCESS CONTROL METHOD AND SYSTEM IN WIRELESS NETWORK

(75) Inventor: Hee-yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 842 days.

(21) Appl. No.: 10/659,359

(22) Filed: Sep. 11, 2003

(65) Prior Publication Data

US 2004/0117497 A1 Jun. 17, 2004

(30) Foreign Application Priority Data

Nov. 30, 2002 (KR) .................. 10-2002-0075646

(51) Int. Cl.
*H04Q 7/34* (2006.01)
(52) U.S. Cl. ...................................... 370/470

(58) Field of Classification Search ................ 370/470, 370/471
See application file for complete search history.

(56) References Cited

U.S. PATENT DOCUMENTS

2005/0147075 A1* 7/2005 Terry .......................... 370/338

FOREIGN PATENT DOCUMENTS

KR 2001-0012418 2/2001

* cited by examiner

*Primary Examiner*—Melvin Marcelo
(74) *Attorney, Agent, or Firm*—Staas & Halsey LLP

(57) ABSTRACT

A method and system varying super-frame length information in a wireless network according to characteristics of transmitted data frames and/or a channel status after a basic service set (BSS) is initiated. Characteristics of a data frame to be transmitted on a MAC layer after the BSS initiation is monitored, and if determined as a result of the monitoring that the super-frame length information needs to be changed due to a variation in a transmission duration of the data frame, the super-frame length information is changed.

13 Claims, 4 Drawing Sheets

MEDIA ACCESS CONTROL METHOD AND SYSTEM IN WIRELESS NETWORK

CROSS-REFERENCE TO RELATED APPLICATIONS

This application claims the priority of Korean Patent Application No. 2002-75646, filed on Nov. 30, 2002, in the Korean Intellectual Property Office, the disclosure of which is incorporated herein in its entirety by reference.

BACKGROUND OF THE INVENTION

1. Field of the Invention

The present invention relates to media access control (MAC) in a wireless network, and more particularly, to a MAC method and system, which can vary a super-frame length in accordance with a channel status and a data characteristic in a wireless local area network (WLAN).

2. Description of the Related Art

A WLAN is a data communications network in which MAC layers and physical layers wirelessly operate a local area network. A plurality of mobile stations connected to an access point (AP) in the WLAN share a channel provided through the AP. In order to allow a plurality of mobile stations to access the shared channel with maximum performance, the MAC layers for the WLAN are standardized according to the IEEE (Institute of Electrical and Electronics Engineers) 802.11 standard.

A super-frame, defined in the IEEE 802.11 standard, represents an access to a wireless medium in a time axis. The wireless medium is a channel, having physical radio frequency (RF) characteristics. The super-frame comprises a distributed coordination function (DCF) period using a contention based CDMA/CA (Code Division Multiple Access/Collision Avoidance) protocol, and a point coordination function (PCF) period using a polling list to transmit data within a predetermined time period called a contention period. In other words, as shown in FIG. 1, the super-frame comprises a contention free period (CFP), i.e., the PCF period, in which frames or protocol data units can be transmitted without contention, and a contention period (CP), i.e., the DCF period, in which the frames or protocol data units can be transmitted with contention.

The frames transmitted during the CFP may be characterized as periodic data. For example, in wireless transmissions to a television, data continued in a constant unit is transmitted during the CFP. Therefore, during the CFP, the AP polls a selected mobile station to transmit the frames. On the other hand, the frames transmitted during the CP may be characterized as non-periodic data. For example, data transmitted through the Internet is transmitted during the CP. Therefore, during the CP, priority is assigned to the data frames from each mobile station, and the data frame assigned the highest priority during the CP has the highest chance to access a channel. The lengths of the CFP and the CP vary depending on the number of mobile stations connected to the AP, and the data characteristics.

However, according to the IEEE 802.11 MAC standard, the super-frame length is fixed according to the number of beacon frames, when a mobile station is initialized and when a basic service set (BSS) is produced, and, thus, the super-frame length is not changeable before (until) the BSS is eliminated (terminated) at which time the mobile station may be re-initialized with a new super-frame length according to the beacon frame numbers.

Since the super-frame length is fixed as described above, any variable ranges of the lengths of the CFP and the CP are limited to the super-frame length. Therefore, in a case where a payload of a frame to be transmitted is long, and the remaining super-frame duration is insufficient, the frame cannot be entirely transmitted. Thus, the corresponding data frame is fragmented at the transmitting stage so that a portion of the fragmented frame data can be transmitted during the corresponding super-frame period and then the remaining portion during the next super-frame period. When the data frame is transmitted fragmented as described above, the received fragments of the data frame must be de-fragmented at the receiving stage.

As described above, according to the conventional IEEE 802.11 MAC method, since the frame data is transmitted through fragmentation and de-fragmentation, it takes a long time to process the frame data in a WLAN. In addition, since the super-frame length is fixed, and, accordingly, a limited length (transmission duration) is available for burst data, the WLAN system capability for processing periodic data is not flexible. Since the WLAN system capability for processing periodic data is limited due to the super-frame, the entire WLAN system performance deteriorates.

SUMMARY OF THE INVENTION

The present invention provides a media access control (MAC) method and system, which can vary a super-frame length in accordance with a data frame characteristic and/or a channel status in a wireless local area network (WLAN).

The present invention also provides a MAC method and system, which can vary a super-frame length according to a result of monitoring a data frame characteristic and/or a channel status while MAC layers are operated in a WLAN.

The present invention further provides a MAC method and system, which can vary a super-frame length in conjunction with a length of a contention free period (CFP) and a length of a contention period (CP), wherein the lengths of the CFP and CP are varied in accordance with a data frame characteristic and/or a channel status in a WLAN.

Additional aspects and advantages of the invention will be set forth in part in the description which follows and, in part, will be obvious from the description, or may be learned by practice of the invention.

The present invention may be achieved by a wireless local area network method, comprising monitoring a characteristic of a data frame to be transmitted on a MAC layer after a basic service set (BSS) for the wireless network starts, and changing the super-frame length if determined as a result of the monitoring that a super-frame length needs to be changed due to a variation in a transmission duration of the data frame.

According to an aspect of the present invention, the monitoring comprises monitoring whether a data frame and a payload length of the data frame correspond to a contention free period (CFP) or to a contention period (CP).

According to an aspect of the present invention if determined that lengths of the CFP and the CP are changeable within a range of a currently fixed length of the super-frame, the super-frame length is not changed.

According to an aspect of the present invention, the monitoring further comprises monitoring a channel status of the wireless network, and changing the super-frame length in consideration of the channel status.

According to an aspect of the present invention, the channel status comprises a number of stations connected to the BSS, a number of retransmissions of the data frame, and a channel utilization rate.

The present invention may be also achieved by a MAC system in a wireless local area network, which comprises a protocol controller analyzing a characteristic of a data frame to be transmitted on a MAC layer after starting a basic service set (BSS) for the wireless network and controlling the data frame transmission on the MAC layer, and a channel monitor monitoring the characteristic of the data frame analyzed through the protocol controller, determining as a result of the monitoring whether a super-frame length needs to be changed due to a variation in a transmission duration of the data frame, changing the super-frame length, and informing the protocol controller of the changed length of the super-frame to transmit the data frame according to the changed super-frame length.

According to an aspect of the present invention, the protocol controller analyzes data included in an information area of the data frame, detects a data characteristic including user priority, and discriminates whether the data frame and a payload length of the data frame correspond to a contention free period (CFP) or to a contention period (CP).

According to an aspect of the present invention, if determined that lengths of a contention free period (CFP) and a contention period (CP) are changeable within a range of a currently fixed length of the super-frame, the channel monitor does not change the super-frame length.

According to an aspect of the present invention, the MAC system further comprises a management information base (MIB) storing information on a channel status analyzed through the protocol controller and a change range of the super-frame length, wherein the channel monitor further considers a result of monitoring the information stored in the MIB to determine whether the super-frame length needs to be changed.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
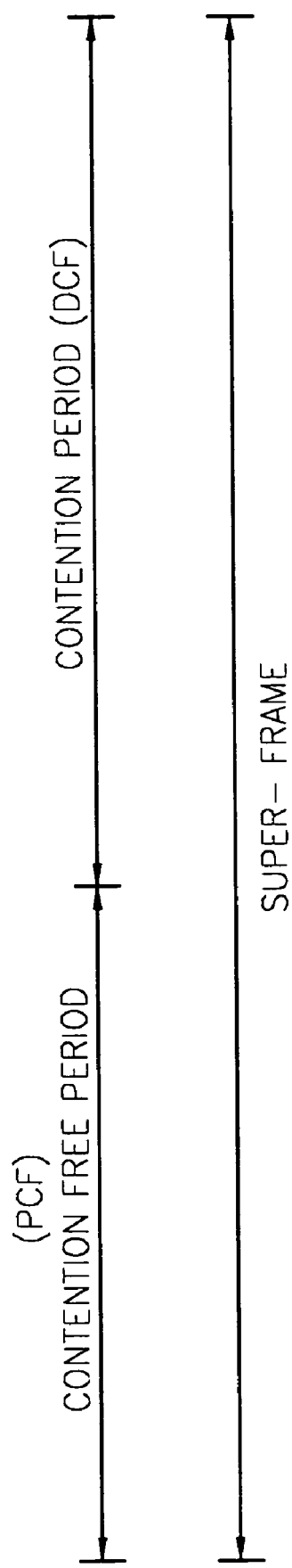
FIG. 1 is a super-frame format diagram for transmitting and receiving data (data frames) during the standard media access control in a wireless local area network.

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 2:
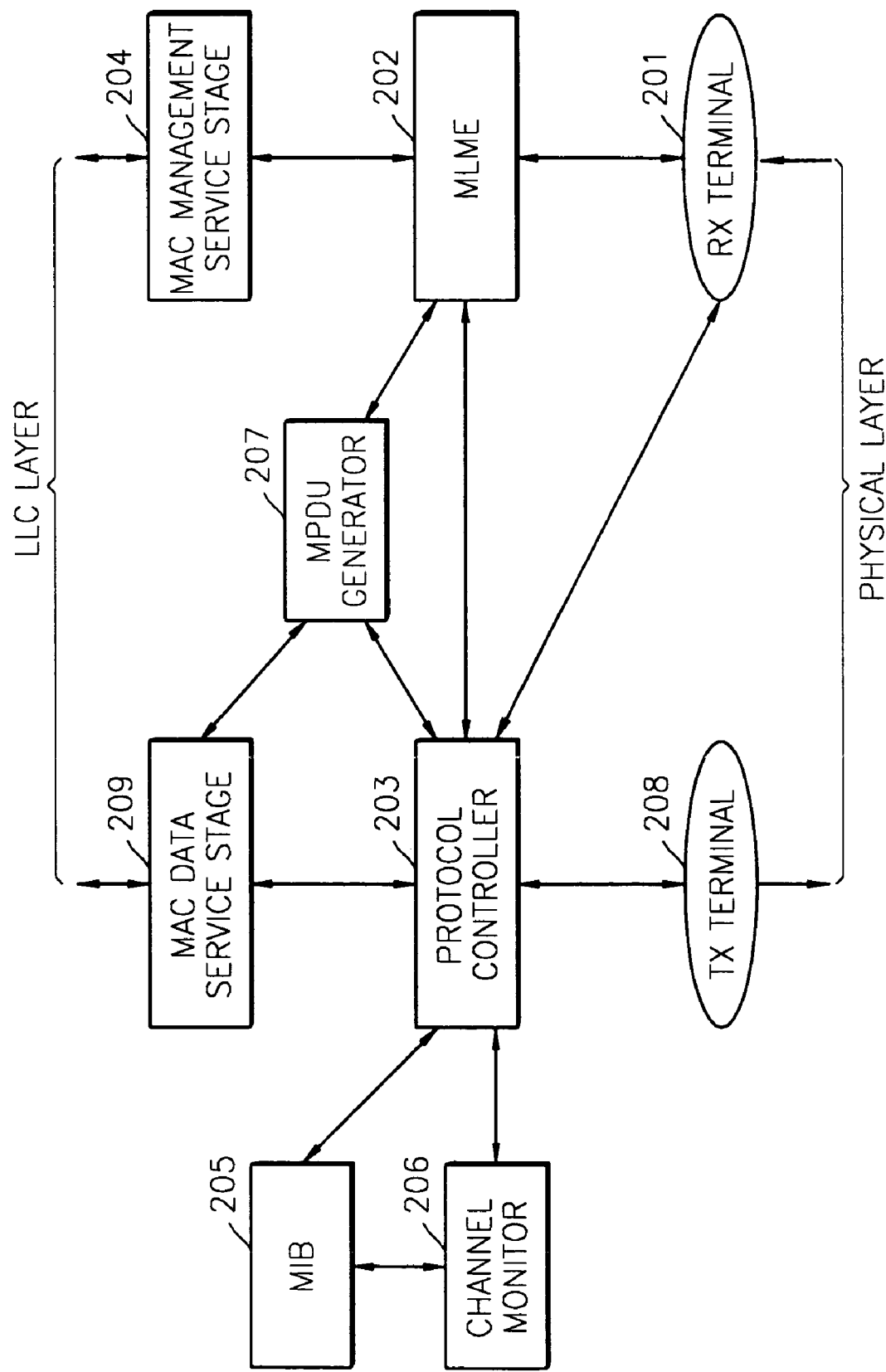
FIG. 2 is a functional block diagram of a media access control system in a wireless local area network, according to an embodiment of the present invention.

An embodiment of the present invention will now be described with reference to FIGS. 2 to 4. FIG. 2 is a functional block diagram of a media access control (MAC) system in a wireless local area network, according to an embodiment of the present invention. Referring to FIG. 2, the MAC system according to the present invention comprises a reception (RX) terminal 201, a MAC layer management entity (MLME) 202, a protocol controller 203, a MAC management service stage 204, a management information base (MIB) 205, a channel monitor 206, a MAC protocol data unit (MPDU) generator 207, a transmission (TX) terminal 208, and a MAC data service stage 209.

The RX terminal 201 receives a data frame transmitted through a physical layer. Thus, if the MAC system is located in an access point (AP) of a wireless local area network (WLAN), the RX terminal 201 receives a data frame transmitted from a mobile station included in a basic service set (BSS) of the AP. If the received data frame includes information for managing MAC layers, the RX terminal 201 transmits the received data frame to the MLME 202, and if not, to the protocol controller 203.

The MLME 202 provides the protocol controller 203 with various parameters required for producing the BSS and beacon frames after the AP reset (e.g., when the mobile station system connected to an AP is turned on). In addition, in the case the MLME 202 receives a data frame including MAC management information from the RX terminal 201, the MLME 202 provides the MAC management service stage 204 with the management information transmitted from the RX terminal 201 so that managements needed to operate the MAC layers can be performed. The RX terminal 201, the MLME 202, and the MAC management service stage 204 operate according to the IEEE 802.11 standard.

When the protocol controller 203 receives the data frame transmitted from the RX terminal 201, the protocol controller 203 analyzes data included in an information area of the data frame, and stores information for managing mobile stations connected to the AP in the MIB 205. However, in addition, the protocol controller 203 analyzes characteristics of the currently transmitted data frame, such as whether the data frame corresponds to a contention free period (CFP) or to a contention period (CP), and information on a payload length of the data frame, and stores the analyzed data frame characteristics. Typically, the protocol controller 203, based upon the data frame information area, detects a data characteristic comprising a user priority, or other data frame type identifying information, and determines whether the data frame and a payload length of the data frame correspond to a contention free period (CFP) or to a contention period (CP) of the MAC layer super-frame. Further, when information on a super-frame length determined at the channel monitor 206 is provided, the protocol controller 203 controls the MPDU generator 207 to include the super-frame length information in a beacon frame or a probe response to be provided to each mobile station. The super-frame length information comprises length information for the super-frame, the CFP, and/or the CP.

Typically, the MIB also stores channel information on mobile stations connected to the AP. The channel information includes, for example, address information on the number of mobile stations connected to the AP, information on the number of data frame retransmissions, information on a channel utilization rate, information on packet error rates, authentication information, power management information, information on the number of joined mobile stations, etc.

The channel monitor 206 monitors the number of mobile stations connected to the AP based on the channel information stored in the MIB 205, according to which an efficient super-frame length can be determined. However, in addition, the channel monitor 206 monitors a characteristic of the data frame currently transmitted through the MAC layers with reference to the analysis results on the data frame, which are stored at the protocol controller 203. In other words, the channel monitor 206 monitors how many data frames should be transmitted during the CFP and during the CP, how long the payload length of the data frames should be, etc., based on the analysis results (i.e., the data frame characteristics and the channel information) stored at the protocol controller 203 and/or the channel information stored in the MIB 205, to dynamically adjust during the BSS the super-frame length information, including adjusting the super-frame length itself, in response to a variation in a transmission duration of the data frame based upon the monitoring of the analysis result.

More particularly, based on the monitoring results stored by/in the protocol controller 203, the channel monitor 206 decides whether the currently fixed lengths of the CFP and the CP are adequate, and if inadequate, how much the lengths should be changed, and whether a super-frame length should be changed due to the changes of the lengths of the CFP and/or the CP. If there is a need to change the super-frame length, the channel monitor 206 also decides how much the super-frame length should be changed in consideration of the currently fixed super-frame length and the payload length of the currently transmitted data frame.

Therefore, in a case where according to the stored monitoring results periodic data frame is mostly included in the data frame, the channel monitor 206 increases the length of the CFP and adequately changes the super-frame length. On the other hand, in a case where a best effort (priority) format data, such as IP data, is mostly included in the data frame, the channel monitor 206 increases the length of the CP and adequately decides the super-frame length. However, typically, if the changed lengths of the CFP and/or the CP are within the range of the currently fixed length of the super-frame, the super-frame length is not changed.

Figure 3:
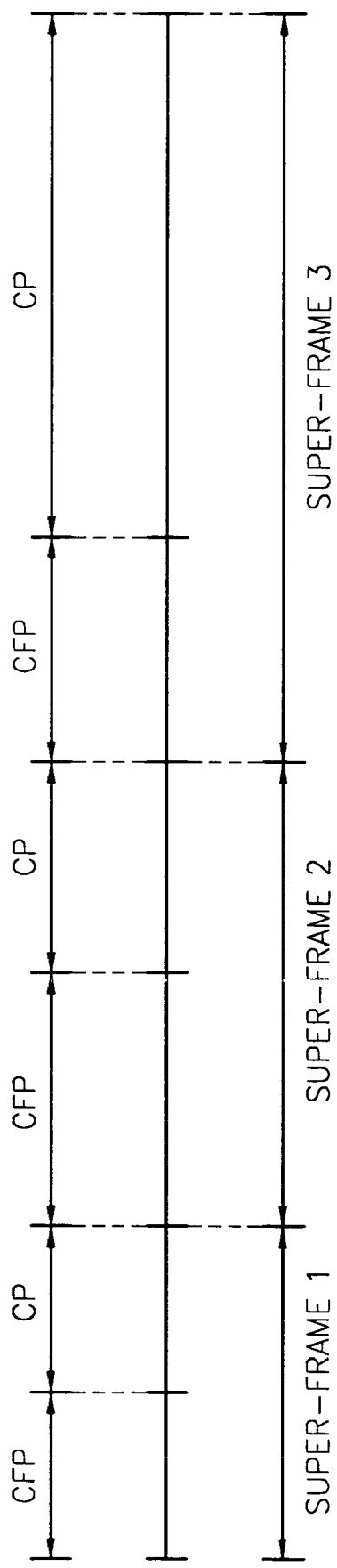
FIG. 3 is a super-frame format diagram, the length of which varies, for transmitting and receiving data (data frames), according to an embodiment of the present invention.

FIG. 3 is a super-frame format diagram, the length of which varies, for transmitting and receiving data (data frames), according to an embodiment of the present invention. That is, as shown in FIG. 3, in a case where the currently fixed length of the super-frame is the length of super-frame 1 in FIG. 3, if the payload length of the data frame transmitted during the CFP increases while there is no change in the payload length of the data frame transmitted during the CP, the lengths of the CFP and the super-frame can be changed to the lengths shown in super-frame 2 of FIG. 3. Further, after the super-frame length has been changed to the length shown in super-frame 2 of FIG. 3, if the payload length of the data frame transmitted during the CP increases while there is no change in the payload length of the data frame transmitted during the CFP, the length of the CP as well as the super-frame length can be changed to the lengths shown in super-frame 3 of FIG. 3.

The monitoring operations of the channel monitor 206 are continuously performed from the starting time of the BSS to the ending time thereof. Therefore, the MAC system according the present invention can vary the super-frame length at any time when a need to change the super-frame arises during the transmission of MAC protocol data units. The channel monitor 206 provides information on the lengths of the super-frame, the CFP, and the CP to the protocol controller 203, depending upon data frame characteristics, such as a data frame super-frame period type (e.g., CP data frame, a CFP data frame, etc.) and payload length information, and/or channel information.

The protocol controller 203 provides/controls the MPDU generator 207 with/according to changed super-frame length information provided from the channel monitor 206. Accordingly, typically, the MPDU generator 207 includes the super-frame length information in a beacon frame or a probe response to be provided to each mobile station, so that the relative mobile stations connected to the AP can be informed of the changed length of the super-frame. Further, the MPDU generator 207 generates protocol data units in accordance with the IEEE 802.11 standard and the changed super-frame length information, and transmits the generated protocol data units to the protocol controller 203. Then, the protocol controller 203 transmits the protocol data units received from the MPDU generator 207 to the physical layers through the TX terminal 208, the protocol data unit being according to the changed super-frame length information provided from the channel monitor 206.

The MAC data service stage 209 transmits data frames received from the protocol controller 203 to logical link control (LLC) layers, and transmits data frames received from the LLC layers to the protocol controller 203. The MAC data service stage 209 also operates in accordance with the IEEE 802.11 standard.

Figure 4:
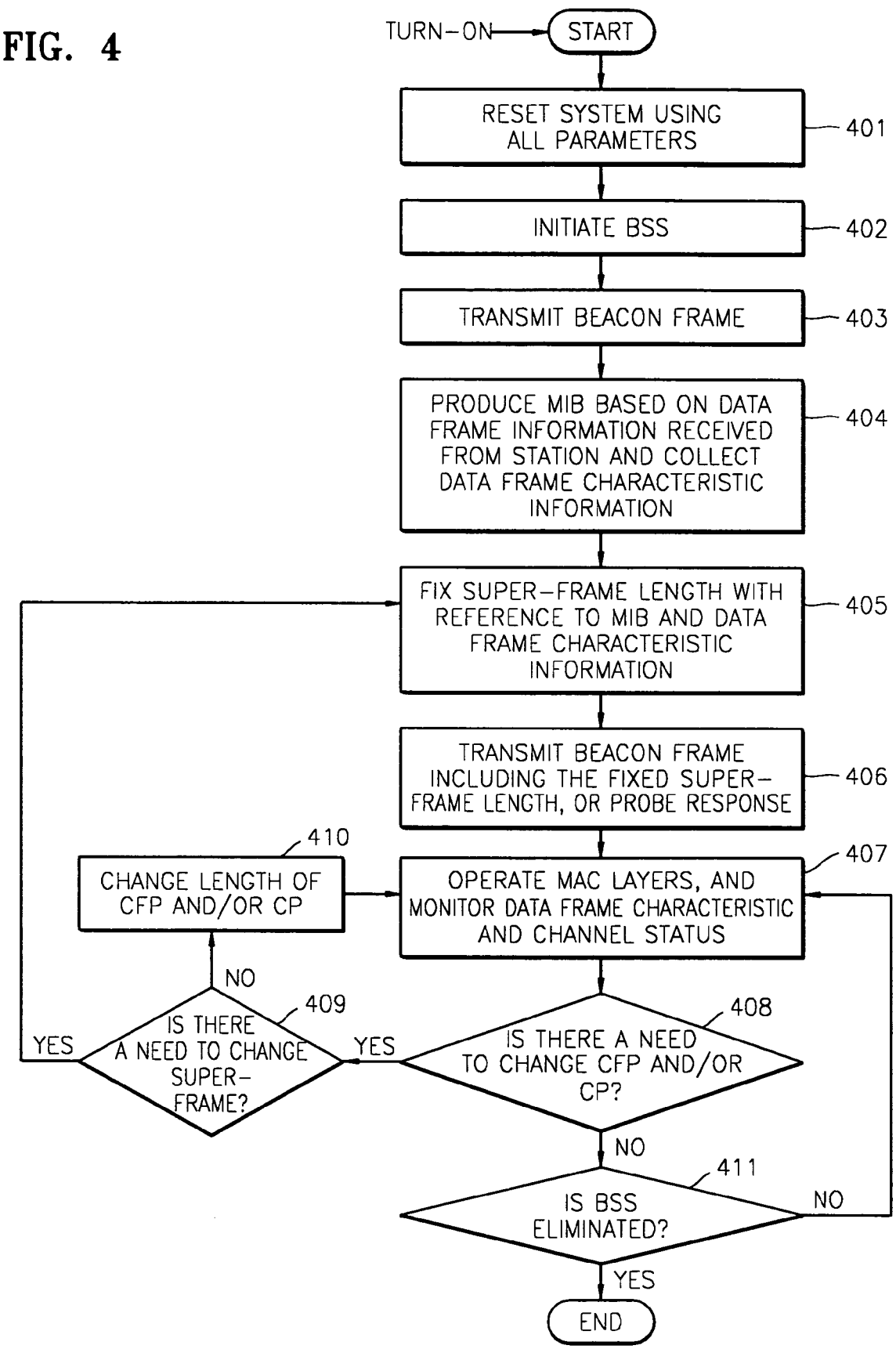
FIG. 4 is a flowchart of a media access control method in a wireless local area network, according to an embodiment of the present invention.

FIG. 4 is a flowchart of a media access control method in a wireless local area network (i.e., a flowchart of controlling MAC in a wireless local area network), according to an embodiment of the present invention. When a corresponding system, i.e., an AP connected to a wireless local area network is turned on, at operation 401, the protocol controller 203 resets the system based on the parameters provided from the MLME 202 and those stored in the protocol controller 203.

At operation 402, the protocol controller 203 initiates the BSS. Then, in operation 403, the protocol controller 203 controls the MPDU generator 207 to generate beacon frames according to the IEEE 802.11 standard using the parameters provided from the MLME 202, and transmits the beacon frames to mobile stations through the TX terminal 208. Accordingly, the mobile stations can be provided with information on a shareable channel in the AP and other AP related information. In operation 404, the protocol controller 203 analyzes data included in an information area of a data frame received from a mobile station through the RX terminal 201 to produce MIB information, and collects information on a characteristic of the data frame. Typically, the MIB stores channel status information on mobile stations connected to the AP, such as addresses assigned to each mobile station, information on data frame retransmissions, information on a channel utilization rate, information on packet error rates, authentication information, power management information, information on the number of joined mobile stations, etc.

In operation 405, the channel monitor 206 monitors a characteristic of the data frame and/or a channel status with reference to the data frame characteristic information stored (collected) in the protocol controller 203 and the MIB, respectively, and based on the monitoring results, the channel monitor 206 decides on a super-frame length. Here, the super-frame length can be a default super-frame length if there have been no changes in lengths of a CFP and/or a CP, or if the lengths of the CFP and the CP have been changed and the changed lengths are within a range of the default super-frame length. However, if the monitoring result indicates that the lengths of the CFP and/or the CP should be changed, and accordingly, the super-frame length should be changed, a new super-frame of sufficient length is determined. The channel monitor 206 provides any changed super-frame length information to the protocol controller 203. In operation 406, the protocol controller 203 controls the MPDU generator 207 to transmit a beacon frame including the new super-frame length or a probe response through the TX terminal 208. Typically, the probe response is transmitted to the mobile station that has requested the probe.

In operation 407, while MAC layers are operated based upon the changed super-frame length information included, for example, in the beacon frame, the channel monitor 206 continues monitoring the channel status and the data frame characteristics as described above. If operation 408 determines according to the monitoring result in operation 407 that the lengths of the CFP and/or the CP should be changed, then operation 409 determines whether the super-frame length should be changed due to changes of the lengths of the CFP and/or the CP. For example, in a case where periodic data frame is mostly included in the data, it may be determined that the super-frame length should also be changed by increasing the length of CFP, and in a case where a best effort (priority) format data, such as IP data, is mostly included in the data to be transmitted, it may be determined that the super-frame length should also be changed by increasing the length of CP. If operation 409 determines that the super-frame length should be changed, the wireless communication process returns to operation 405 to change the super-frame length information. In particular, at operation 405, the super-frame length is changed and the lengths of the CFP and/or the CP are also changed.

However, if operation 409 determines that there is no need to change the super-frame length while the lengths of the CFP and/or the CP should be changed, then in operation 410, the lengths of the CFP and/or the CP are changed. After the lengths of the CFP and/or the CP are changed in operation 410, the process returns to operation 407 to continue monitoring the data frame characteristics and/or the channel status while the MAC layers are operated.

If operation 408 determines that there is no need to change the lengths of the CFP and/or the CP, then in operation 411, it is examined whether the BSS has been eliminated. If operation 411 determines that the BSS has been eliminated, the operations of the MAC layer are terminated. However, if operation 408 determines that the BSS has not been eliminated, the process returns to operation 407.

As described above, according to the present invention, super-frame length information can be changed according to monitoring data frame characteristics and/or a channel status. Therefore, if a need to change the super-frame length information to avoid fragmentation arises after a BSS is initiated at the MAC layers in a wireless network, such as a WLAN, and the super-frame length information is changed accordingly, more MAC protocol data units (MPDU) can be transmitted without fragmentation. Therefore, channel utilization rates can be improved. In addition, since flexibility in a periodic data processing capability is obtained, quality of service (QoS) for streaming data can be more highly ensured in a wireless network.

The processes of the present invention may be implemented in software or computing hardware, and are embodied, for example, in the channel monitor 206, the protocol controller 203, and the MPDU generator 207. Accordingly the present invention provides a method of controlling the MAC communication protocol layer in a wireless network by varying super-frame length information in the wireless network according to characteristics of transmitted data frames and/or a channel status after a basic service set (BSS) is initiated. Characteristics of a data frame to be transmitted on a MAC layer after the BSS initiation are monitored, and if determined as a result of the monitoring that the super-frame length information needs to be changed due to a variation in a transmission duration of the data frame, the super-frame length information is changed. More particularly, the present invention provides a wireless network access point, comprising a controller controlling the wireless network media access control (MAC) layer data communication according to a process of varying the wireless network MAC layer super-frame length according to transmitted data frame super-frame period type, payload length information, and/or channel information after initiation of a wireless network basic service set (BSS) fixing the MAC layer super-frame length.

While the present invention has been particularly shown and described with reference to a few embodiments thereof, it will be understood by those of ordinary skill in the art that various changes in form and details may be made therein without departing from the spirit and scope of the present invention as defined by the appended claims and their equivalents.

What is claimed is:

1. A method of controlling a media access control (MAC) communication protocol layer in a wireless network, comprising:
   monitoring a characteristic of a data frame to be transmitted on a MAC layer after a basic service set (BSS) for the wireless network starts; and
   changing the MAC layer super-frame length, if determined based upon the monitoring that a super-frame length needs to be changed due to a variation in a transmission duration of the data frame.

2. The MAC method according to claim 1, wherein the monitoring comprises monitoring whether a data frame and a payload length of the data frame correspond to a contention free period (CFP) or to a contention period (CP) of the MAC layer super-frame.

3. The MAC method according to claim 2, wherein the changing comprises not changing the super-frame length, if determined that lengths of the CFP and the CP are changeable within a range of a currently fixed length of the super-frame.

4. The MAC method according to claim 1, further comprising:
   monitoring a channel status of the wireless network; and
   changing the super-frame length in consideration of the channel status.

5. The MAC method according to claim 4, wherein the channel status comprises a number of stations connected to the BSS, a number of data frame retransmissions, and a channel utilization rate.

6. A media access control (MAC) communication protocol layer system in a wireless network, comprising:
   a protocol controller analyzing a characteristic of a data frame to be transmitted on the wireless network MAC layer after a basic service set (BSS) for the wireless network starts; and
   a channel monitor monitoring the analyzed characteristic of the data frame, determining according to the monitoring whether to change the MAC layer super-frame length due to a variation in a transmission duration of the data frame, changing the super-frame length, and informing the protocol controller of the changed super-frame length.

7. The MAC system according to claim 6, wherein the protocol controller analyzes an information area of the data frame to be transmitted, detects a data characteristic comprising a user priority, and determines whether the data frame and a payload length of the data frame correspond to a contention free period (CFP) or to a contention period (CP) of the MAC layer super-frame.

8. The MAC system according to claim 7, wherein the channel monitor does not change the super-frame length, if determined that lengths of a contention free period (CFP) and a contention period (CP) are changeable within a range of a currently fixed length of the super-frame.

9. The MAC system according to claim 6, wherein the protocol controller analyzes a channel status of the wireless network, the system further comprising a management information base (MIB) storing the analyzed channel status information, wherein the channel monitor further monitors the analyzed channel status information stored in the MIB to determine whether to change the MAC layer super-frame length.

10. The MAC system according to claim 9, wherein the channel status comprises a number of stations connected to the BSS, a number of data frame retransmissions, and a channel utilization rate.

11. A wireless network media access control (MAC) communication protocol layer controller, comprising:
a programmed computer processor monitoring a characteristic of a data frame to be transmitted on the MAC layer after initiating a basic service set (BSS) for the wireless network, and changing the MAC layer super-frame length according to a variation in a transmission duration of the data frame based upon the monitoring.

12. A wireless network access point, comprising:
a controller controlling data communication by the wireless network media access control (MAC) layer, according to a process comprising:
varying the wireless network MAC layer super-frame length according to transmitted data frame super-frame period type, payload length information, and/or channel status information after initiation of a wireless network basic service set (BSS) fixing the MAC layer super-frame length.

13. A media access control (MAC) system comprising:
a protocol controller analyzing a characteristic of a data frame to be transmitted on a wireless network media access control (MAC) layer after initiation of a basic service set (BSS) for the wireless network;
a channel monitor monitoring the analyzed characteristic of the data frame, determining according to the monitoring whether to change a super-frame length of the MAC layer due to a variation in a transmission duration of the data frame, and informing the protocol controller of the changed super-frame length; and
a MAC protocol data unit generator including the changed super-frame length in a beacon frame, or a probe response, to be provided to each wireless network mobile station in response to the protocol controller providing the changed super-frame length, and generating protocol data units to be transmitted according to the wireless network MAC layer including the changed super-frame length.

* * * * *